(12) United States Patent
Kitabayashi et al.

(10) Patent No.: US 11,234,037 B2
(45) Date of Patent: Jan. 25, 2022

(54) PROJECTOR AND DISPLAY SYSTEM

(71) Applicant: SEIKO EPSON CORPORATION, Tokyo (JP)

(72) Inventors: Kazuyoshi Kitabayashi, Azumino (JP); Takahiro Otsu, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 162 days.

(21) Appl. No.: 16/039,072

(22) Filed: Jul. 18, 2018

(65) Prior Publication Data

US 2019/0037265 A1  Jan. 31, 2019

(30) Foreign Application Priority Data

Jul. 28, 2017 (JP) .............................. JP2017-146227

(51) Int. Cl.
| | | |
|---|---|---|
| *H04N 21/41* | (2011.01) | |
| *H04N 5/775* | (2006.01) | |
| *G03B 21/14* | (2006.01) | |
| *H04N 21/472* | (2011.01) | |
| *H04N 9/31* | (2006.01) | |
| *H04N 21/432* | (2011.01) | |
| *G06F 3/14* | (2006.01) | |
| *H04N 5/76* | (2006.01) | |

(52) U.S. Cl.
CPC ......... *H04N 21/4122* (2013.01); *G03B 21/14* (2013.01); *G06F 3/1423* (2013.01); *H04N 5/775* (2013.01); *H04N 9/3147* (2013.01); *H04N 21/4325* (2013.01); *H04N 21/47217* (2013.01); *G03B 2206/00* (2013.01); *H04N 5/76* (2013.01)

(58) Field of Classification Search
CPC ..... H04N 21/4122; H04N 9/3147; G09G 5/12
See application file for complete search history.

(56) References Cited

U.S. PATENT DOCUMENTS

| | | | |
|---|---|---|---|
| 8,451,375 B2 * | 5/2013 | Ejima | H04N 21/4307 |
| | | | 348/515 |
| 2009/0213777 A1 | 8/2009 | Ogawa et al. | |
| 2016/0119507 A1 * | 4/2016 | Duyvejonck | H04N 9/3147 |
| | | | 348/512 |
| 2016/0212393 A1 | 7/2016 | Fujioka et al. | |
| 2016/0267878 A1 | 9/2016 | Maeda et al. | |
| 2018/0018941 A1 * | 1/2018 | Monden | H04N 9/3179 |

FOREIGN PATENT DOCUMENTS

| | | |
|---|---|---|
| JP | 2008-537791 A | 9/2008 |
| JP | 2009-175294 A | 8/2009 |
| JP | 2009-205396 A | 9/2009 |
| JP | 2014-21988 A | 2/2014 |
| JP | 2015-531125 A | 10/2015 |
| JP | 2016-133608 A | 7/2016 |
| JP | 2016-170351 A | 9/2016 |
| JP | 2018-010109 A | 1/2018 |
| WO | 2006/107585 A2 | 10/2006 |
| WO | 2014/014308 A1 | 1/2014 |
| WO | 2014/025806 A2 | 2/2014 |

* cited by examiner

*Primary Examiner* — Nathan J Flynn
*Assistant Examiner* — Christine A Kurien
(74) *Attorney, Agent, or Firm* — Oliff PLC (57) ABSTRACT

A projector includes: a projection unit which projects content in response to a playback instruction to play back the content; and a transmitting unit which transmits the playback instruction to another projector. The playback instruction includes specification information which specifies the content.

5 Claims, 7 Drawing Sheets

PROJECTOR AND DISPLAY SYSTEM

CROSS-REFERENCE

The entire disclosure of Japanese Patent Application No. 2017-146227, filed Jul. 28, 2017 is expressly incorporated by reference herein.

BACKGROUND

1. Technical Field

The present invention relates to a projector, a method for controlling a projector, and a display system.

2. Related Art

According to the related art, a system which displays content using a plurality of projectors is known, as disclosed in JP-A-2016-170351. In such a system, the plurality of projectors can be set to the same time via communication and thus can collaborate with each other to display content.

However, to make the plurality of projectors collaborate with each other, it is necessary to communicate information of content to be played back to each projector and instruct each projector to play back the content, in addition to setting the projectors to the same time. This involves complicated operations and therefore reduces user-friendliness.

SUMMARY

An advantage of some aspects of the invention is that collaborative projection by a plurality of projectors is easily realized.

The invention can be implemented as the following forms or application examples.

Application Example 1

A projector according to this application example includes: a projection unit which projects content in response to a playback instruction to play back the content; and a transmitting unit which transmits the playback instruction to another projector. The playback instruction includes specification information which specifies the content.

With such a configuration, the projector projects the content in response to the playback instruction including the specification information specifying the content, and also transmits the playback instruction to another projector, thus enabling another projector to project the content in response to the playback instruction. This enables easy execution of collaborative projection by a plurality of projectors.

Application Example 2

It is preferable that the projector according to the foregoing application example includes a storage unit which stores a schedule, and that the playback instruction is generated based on the schedule.

With such a configuration, the playback instruction is generated based on the stored schedule. This enables execution of collaborative projection by a plurality of projectors.

Application Example 3

In the projector according to the foregoing application example, it is preferable that the storage unit stores group information and that the transmitting unit transmits the playback instruction to the another projector included in the group information.

With such a configuration, the projector based on the stored group information can be instructed to carry out collaborative projection.

Application Example 4

In the projector according to the foregoing application example, the playback instruction may be a combination of a command designating projection of the content and the specification information.

Application Example 5

A projector according to this application example includes: a receiving unit which receives a playback instruction for content from another projector; and a projection unit which projects the content in response to the playback instruction. The playback instruction includes specification information which specifies the content.

With such a configuration, the projector can receive the playback instruction including the specification information specifying the content, from another projector, and can project the content in response to the received playback instruction. This enables easy execution of collaborative projection by a plurality of projectors.

Application Example 6

In the projector according to the foregoing application example, it is preferable that if the receiving unit receives the playback instruction specifying second content when the projection unit projects first content, the projection unit projects the second content instead of the first content.

With such a configuration, when receiving the playback instruction specifying content, the projector projects the content designated by the playback instruction, instead of the currently projected content. This enables the projector to immediately execute collaborative projection with another projector.

Application Example 7

In the projector according to the foregoing application example, if the receiving unit receives the playback instruction specifying first content when the projector projects the first content, the projection unit may correct a first timing when the first content is projected, based on a time difference between the first timing and a second timing when the playback instruction is received.

With such a configuration, the projector can properly correct the timing of carrying out collaborative projection with another projector, based on the time difference from the timing of another projector.

Application Example 8

A method for controlling a projector according to this application example includes: accepting a playback instruction including specification information which specifies content; transmitting the playback instruction to another projector via communication; and starting projection of the content.

With such a method, the projector projects the content in response to the playback instruction including the specification information specifying the content, and also transmits the playback instruction to another projector, thus enabling another projector to project the content in response to the playback instruction. This enables easy execution of collaborative projection by a plurality of projectors.

Application Example 9

A display system according to this application example includes a first projector and a second projector connected to each other via communication. The first projector includes: a projection unit which projects content in response to a playback instruction for the content; and a transmitting unit which transmits the playback instruction to the second projector. The second projector includes: a receiving unit which receives the playback instruction from the first projector; and a projection unit which projects the content in response to the playback instruction. The playback instruction includes specification information which specifies the content.

With such a configuration, the projector projects the content in response to the playback instruction including the specification information specifying the content, and also transmits the playback instruction to another projector, thus enabling another projector to project the content in response to the playback instruction. This enables easy execution of collaborative projection by a plurality of projectors.

Application Example 10

In the display system according to the foregoing application example, it is preferable that the first projector includes a storage unit which stores a schedule, and that the playback instruction is generated based on the schedule.

With such a configuration, collaborative projection by a plurality of projectors can be designated based on the stored schedule.

Application Example 11

In the display system according to the foregoing application example, it is preferable that, in the first projector, the storage unit stores group information and that the transmitting unit transmits the playback instruction to the second projector included in the group information.

With such a configuration, the projector based on the stored group information can be instructed to carry out collaborative projection.

Application Example 12

In the display system according to the foregoing application example, the playback instruction may be a combination of a command designating projection of the content and the specification information.

Application Example 13

In the display system according to the foregoing application example, it is preferable that, in the second projector, if the receiving unit receives the playback instruction specifying second content when the projection unit projects first content, the projection unit projects the second content instead of the first content.

With such a configuration, when receiving the playback instruction specifying content, the projector projects the content designated by the playback instruction, instead of different content. This enables the projector to immediately execute collaborative projection with another projector.

Application Example 14

In the display system according to the foregoing application example, it is preferable that, in the second projector, if the receiving unit receives the playback instruction specifying first content when the projection unit projects the first content, the projection unit corrects a first timing when the first content is projected, based on a time difference between the first timing and a second timing when the playback instruction is received.

With such a configuration, a difference in the timing of carrying out collaborative projection with another projector can be properly corrected.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described, referring to the drawings.

Embodiment

Figure 1:
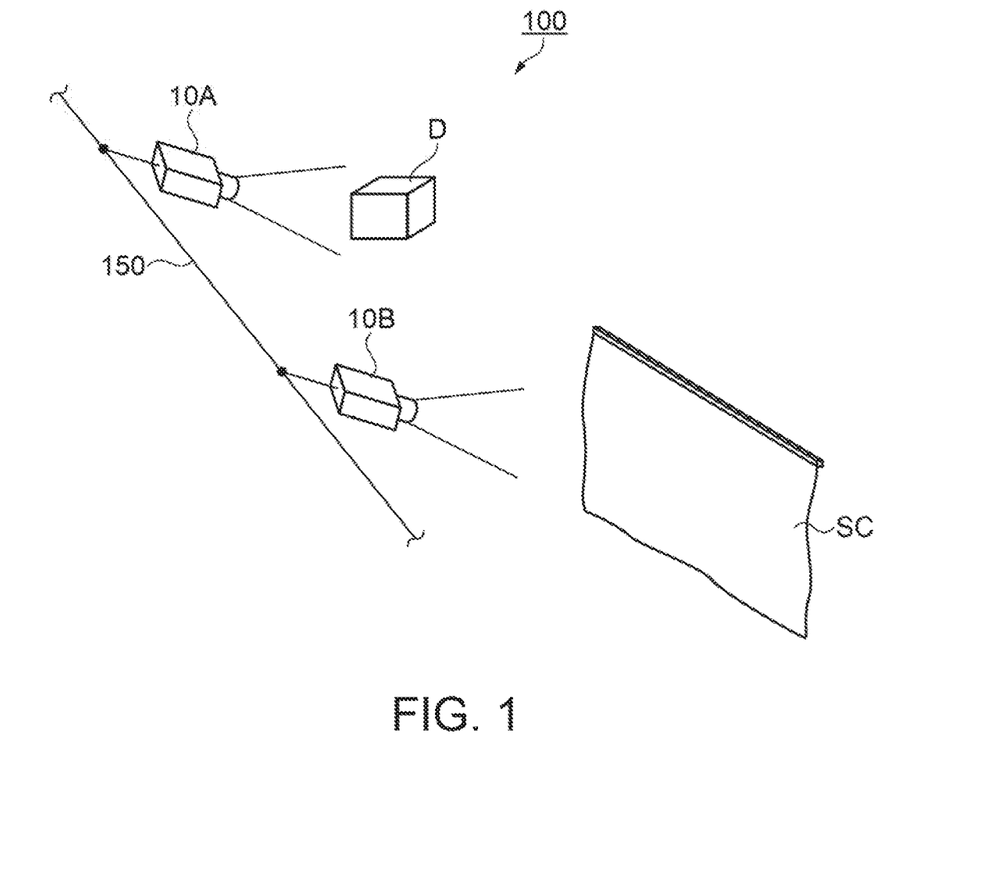
FIG. 1 shows a display system according to an embodiment.

FIG. 1 shows an example of a display system 100 according to this embodiment.

The display system 100 includes a plurality of projectors 10 (projector 10A as a first projector and projector 10B as a second projector). The projector 10A and the projector 10B are connected to each other via a communication line 150 forming a network and thus can communicate with each other. Each of the projector 10A and the projector 10B has an IP (Internet Protocol) address allocated thereto to identify the apparatus on the network.

In the embodiment, the projector 10A projects an image creating a visual effect about a product D, on a predetermined surface of the product D. The projector 10B projects an image creating a predetermined impression, for example, on a transparent screen SC.

The images projected by the projector 10A and the projector 10B are dynamic or still images and may be the same image or different images from each other. If the image projected by the projector 10A is different from the image projected by the projector 10B, these images may have continuity (for example, at the timing when an object displayed in the image projected by the projector 10A disappears, the same object may be displayed in the image projected by the projector 10B). Also, the projector 10A and the projector 10B may output music, sound or the like with the projected image.

The projection targets on which the projector 10A and the projector 10B project images are not limited to the product D and the transparent screen SC.

The number of the projectors 10 forming the display system 100 is not limited to two, such as the projector 10A and the projector 10B, and may be any number equal to or greater than two.

The projector 10A and the projector 10B can carry out simultaneous playback by synchronizing image projection (image display) with each other. For example, the display system 100 installed on a display window synchronizes the effect on the product D with the effect on the transparent screen SC, based on simultaneous playback, thus effectively making the product D look appealing to shoppers.

In the embodiment, the projector 10A and the projector 10B have the same configuration. Therefore, to simplify the description, the configuration of the projector 10A will be described as a representative example.

Figure 2:
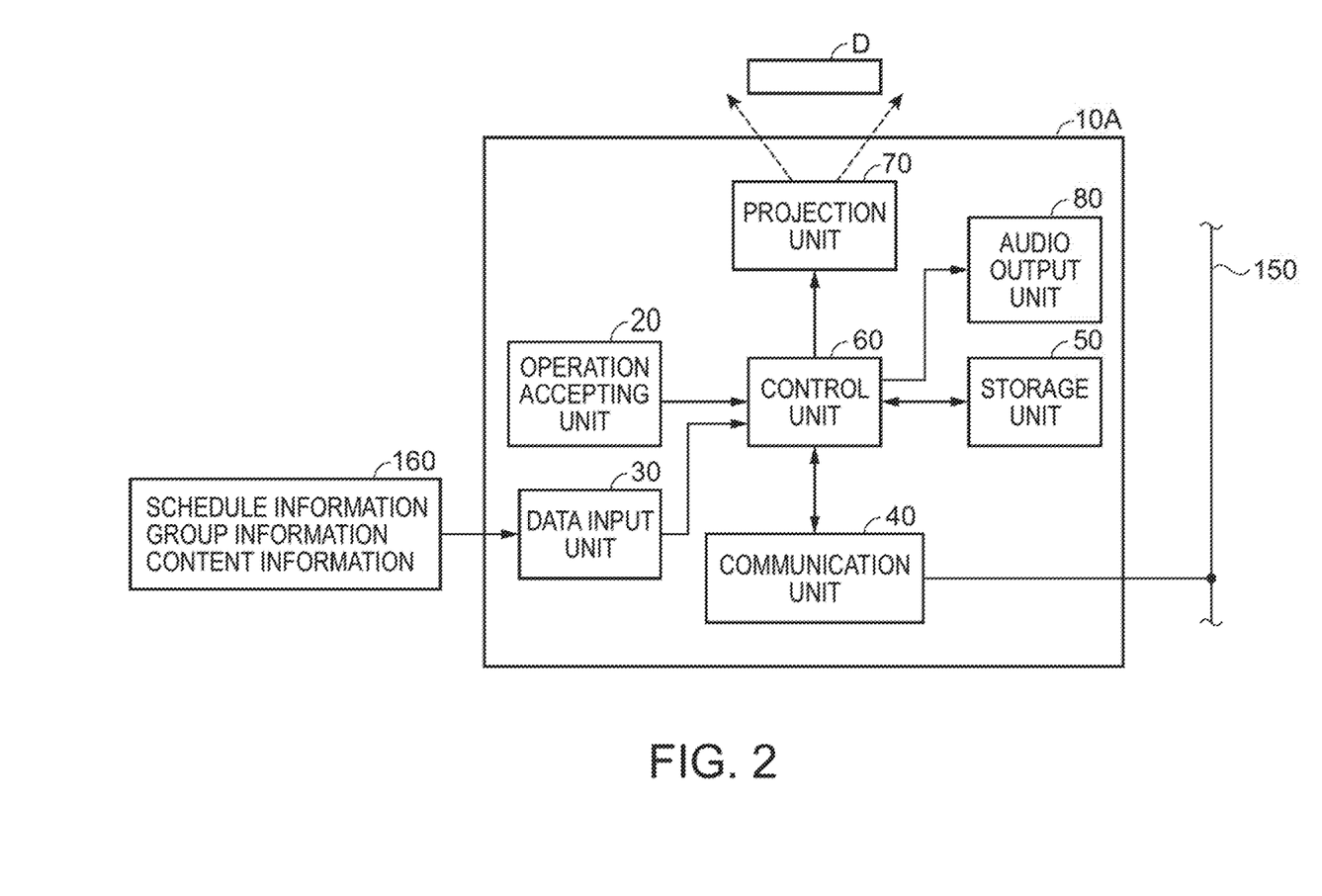
FIG. 2 shows a schematic configuration of a projector.

FIG. 2 shows a schematic configuration of the projector 10A. The projector 10A has an operation accepting unit 20, a data input unit 30, a communication unit 40, a storage unit 50, a control unit 60, a projection unit 70, and an audio output unit 80.

The operation accepting unit 20 includes various operation buttons and operation keys, a touch panel or the like to accept an input operation (for example, an image luminance adjustment operation) or the like by the user. The operation accepting unit 20 may be a remote controller or the like which transmits, wirelessly or via a wire, information corresponding to an input operation accepted from the user. In this case, the projector 10A has a receiving unit which receives the information transmitted from the remote controller. The remote controller has various operation buttons and operation keys, a touch panel or the like to accept, an input operation by the user. The user can give an operation instruction to instruct the projector 10A to operate content, via the operation accepting unit 20.

To the data input unit 30, content information of an image or the like that can be projected by the projector 10A, schedule information showing an operation schedule of the projector 10A, and group information about a group to project synchronously with the projector 10A (in this case, a group including the projector 10B) and the like are inputted. In this embodiment, it is assumed that these pieces of information are written into a semiconductor memory 160 such as USB memory or SD card.

The data input unit 30 has the function of being able to read data written in the semiconductor memory 160 such as USB memory or SD card. The schedule information, the group information, and the content information and the like are written in this semiconductor memory 160.

The schedule information is, for example, information designating images to be projected by the projector 10A in time series. The group information is information expressing attribute information such as the name and IP address of the projector 10 to project synchronously. The group information also includes information indicating whether to synchronously carry out simultaneous projection or not.

The content information includes image data that can be projected by the projector 10A and audio data. In this embodiment, dynamic image data, still image data, and audio data are managed in the form of a playlist. Specification information (content ID) that can univocally specify content is attached to each piece of content. When a plurality of projectors 10 carry out simultaneous playback, the projectors 10 play back content of the same content ID. In this case, it is conceivable that the image data and audio data of the content may differ from one projector 10 to another, even if the content ID is the same.

The communication unit 40 communicates with the projector 10B via the communication line 150. The communication unit 40 has the function of a transmitting unit which transmits a playback instruction including specification information specifying content such as content ID to another projector 10, and the function of a receiving unit which receives a playback instruction for content from another projector 10. In this embodiment, the communication by the communication unit 40 is considered to be wireless communication via Wi-Fi (trademark registered), or wired communication such as Ethernet (trademark registered), IEEE 1334, HDMI (trademark registered), or USB. The wireless communication may be infrared communication, Bluetooth (trademark registered) or the like.

The storage unit 50 is assumed to be, for example, one of semiconductor memories such as HDD (hard disk drive), RAM (random access memory), and ROM (read only memory), or a combination of these.

The storage unit 50 stores information inputted to the data input unit 30 (content information, schedule information, group information), and a program for the projector 10A to be driven, or the like.

The control unit 60 has a processor such as CPU (central processing unit), a RAH used to temporarily store various data, and a non-volatile memory such as mask ROM, flash memory or ferroelectric memory (none of which is illustrated). The control unit 60 thus functions as a computer. The processor of the control unit 60 operates according to a control program stored in the non-volatile memory or the storage unit 50, that is, the hardware and software collaborate, to implement a functional unit provided in the control unit 60. The control unit 60 thus comprehensively controls the operation of the projector 10A.

For example, the control unit 60 can communicate with the projector 10B via the communication unit 40 and thus can cause the projector 10A and the projector 10B to synchronize display images.

Figure 3A:
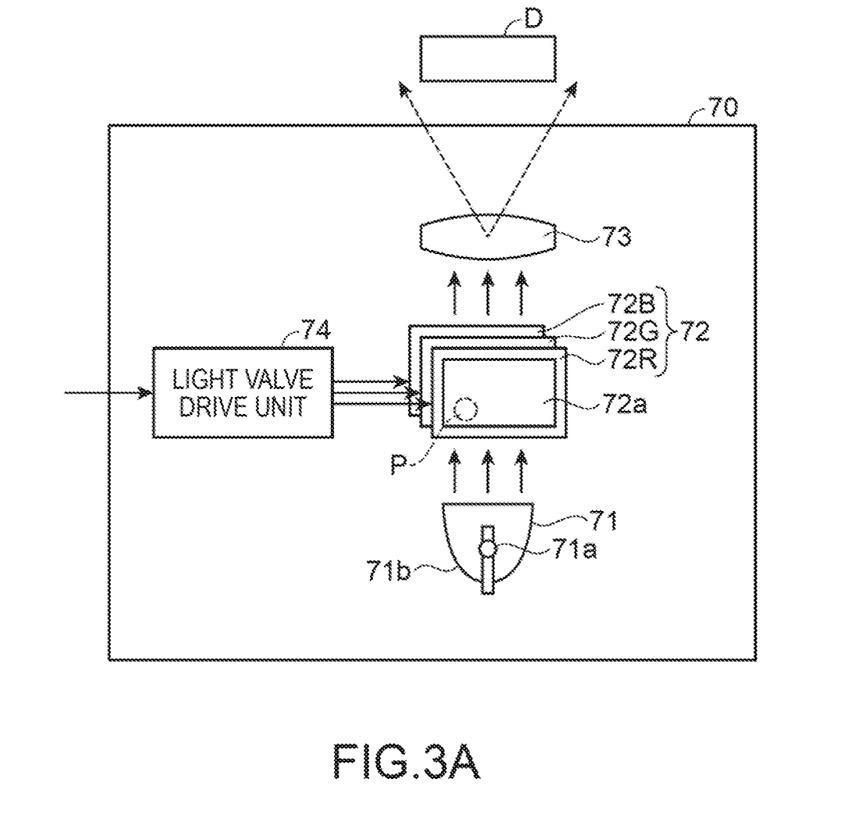
FIG. 3A shows an example of a projection unit.
Figure 3B:
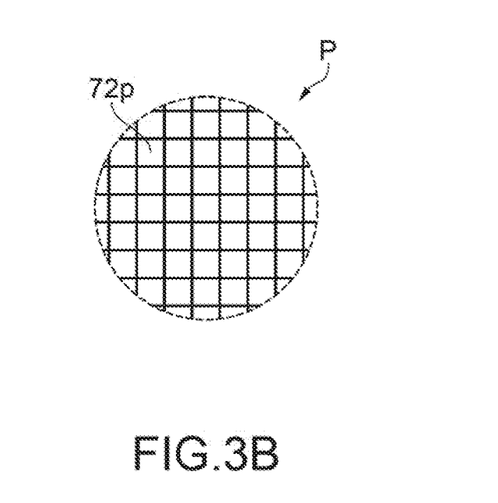
FIG. 3B explains pixels of a liquid crystal light valve.

The projection unit 70 projects an image out-putted from the control unit 60, onto a projection target such as the product D. In this embodiment, the projection unit 70 has the function of projecting content in response to a playback instruction for the content. FIG. 3A shows an example of the projection unit 70. FIG. 3B shows an enlarged view of pixels 72p of a liquid crystal light valve 72.

The projection unit 70 includes a light source 71, three liquid crystal light valves 72 (72R, 72G, 72B) as an example of a light modulation device, a projection lens 73 as an example of a projection system, and a light valve drive unit 74 or the like. The projection unit 70 causes the liquid crystal light valves 72 to modulate light emitted from the light source 71, thus forms a projection image (image light), and projects this projection image through the projection lens 73 in an enlarged manner.

The light source 71 includes a light source lamp 71a made up of a xenon lamp, ultra-high-pressure mercury lamp, LED (light emitting diode) or laser light source, and a reflector 71b which reduces irregularity in the direction of light radiated from the light source lamp 71a. The light emitted from the light source 71 is reduced in luminance distribution irregularity by an optical integration system, not illustrated, and is subsequently split into color light, components of three primary colors of red, (R), green (G), and blue (B) by a color separation system, not illustrated. The R, G, B color light components become incident on the liquid crystal light valves 72R, 72G, 72B, respectively.

Each liquid crystal light valve 72 is formed by a liquid crystal panel made up of a pair of transparent substrates with liquid crystal enclosed between them. In the liquid crystal light valve 72, a rectangular pixel area 72a made up of a plurality of pixels 72p arranged in the form of a matrix shown in FIG. 3B is formed. A drive voltage can be applied to the liquid crystal at each pixel 72p. The light valve drive unit 74 applies, at each pixel 72p, a drive voltage corresponding to image data of content information inputted form the control unit 60. This sets each pixel 72p to a light transmittance corresponding to the image data. Therefore, the light emitted from the light source 71 is transmitted through the pixel area 72a and thus modulated. An image corresponding to the image data is formed for each color light.

The images of the respective colors are combined together for each pixel 72p by a light combining system, not illustrated. A projection image that is a color image is thus generated. The projection image is projected in an enlarged manner on a predetermined surface of the product D via the projection lens 73.

Next, processing in the case where the projector 10A projects an image synchronously with another projector 10 will be described. In this embodiment, the processing is divided into two parts. First, processing to search for a projector 10 that can carry out simultaneous playback will be described. Then, processing to carry out simultaneous playback with the projector 10 that can carry out simultaneous playback will be described.

Figure 4:
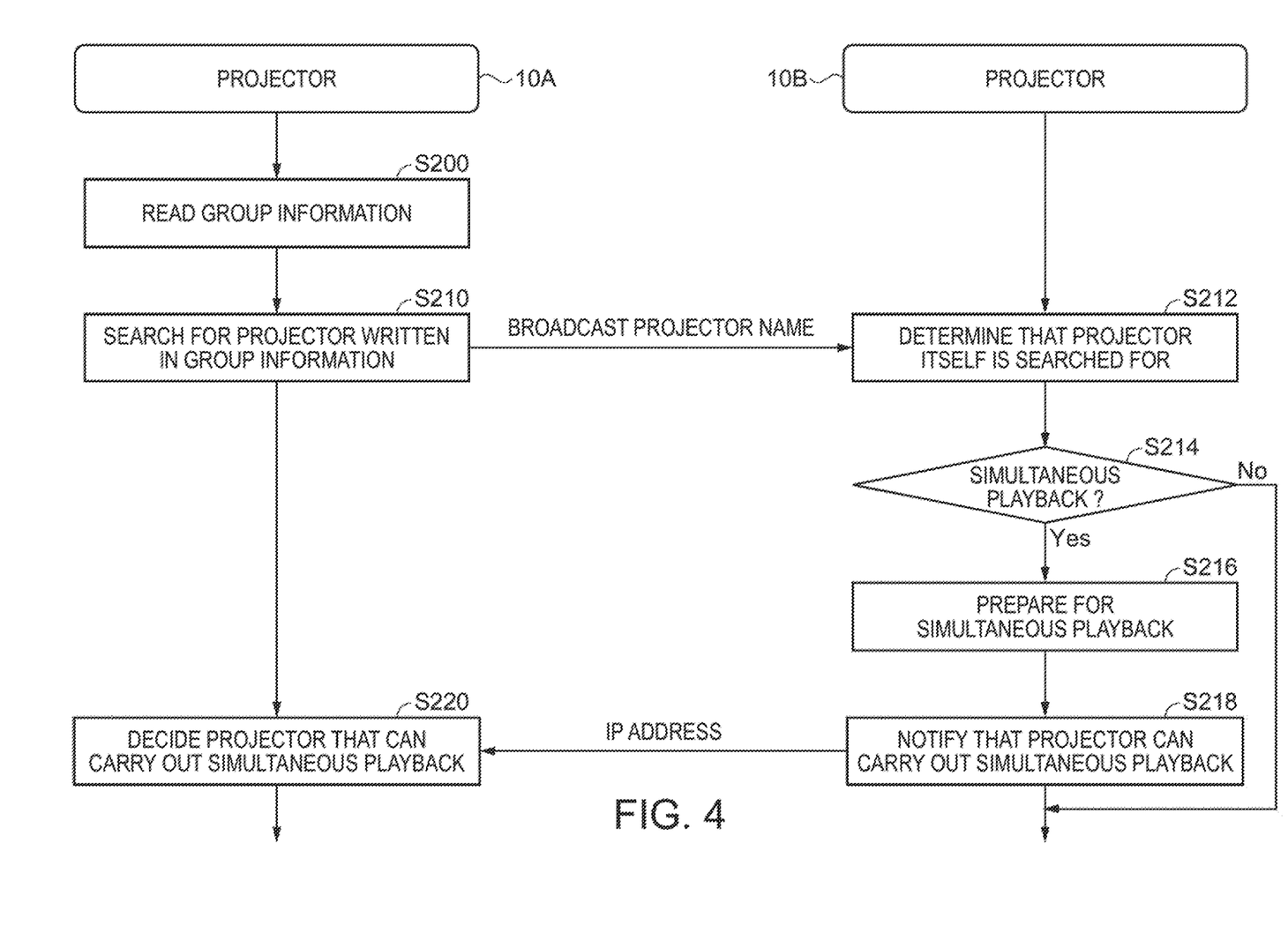
FIG. 4 is a flowchart showing a flow of processing to search for projectors that can carry out simultaneous playback.

First, FIG. 4 is a flowchart showing the flow of the processing to search for a projector 10 that can carry out simultaneous playback. In this embodiment, the projector 10A functions as a server (master) and the projector 10B functions as a client (slave) that can be synchronized with the projector 10A.

As this processing is started, the control unit 60 of the projector 10A reads the group information (step S200).

Next, the control unit 60 of the projector 10A searches for the projector L0B written in the group information, in order to decide a target to be synchronized with based on the group information (step S210). In this embodiment, the control unit 60 of the projector 10A broadcasts the name of the projector 10B via communication by the communication unit 40.

Meanwhile, the control unit 60 of the projector 10B determines that the projector 10B itself is searched for by the projector 10A (step S212), and determines whether the projector 10B is able to carry out simultaneous playback of an image synchronously with the projector 10A or not (step S214).

If the control unit 60 of the projector 10B determines that the projector 10B is unable to carry out simultaneous playback of an image synchronously with the projector 10A (No in step S214), the control unit 60 of the projector 10B ends the processing. The control unit 60 of the projector 10B may also respond to the projector 10A by sending a signal indicating that the projector 10B cannot carry out simultaneous playback.

Meanwhile, if the control unit 60 of the projector 10B determines that the projector 10B is able to carry out simultaneous playback of an image synchronously with the projector 10A (Yes in step S214), the control unit 60 of the projector 10B prepares for simultaneous playback (step S216), then responds to the projector 10A by sending a signal indicating that the projector 10B can carry out simultaneous playback (step S218), and ends the processing. In this embodiment, the control unit 60 of the projector 10B transmits its own IP address to the projector 10A.

The control unit 60 of the projector 10A receives the IP address transmitted from the projector 10B, recognizes that the projector 10B can carry out simultaneous playback, based on the IP address (step S220), and ends the processing.

Figure 5:
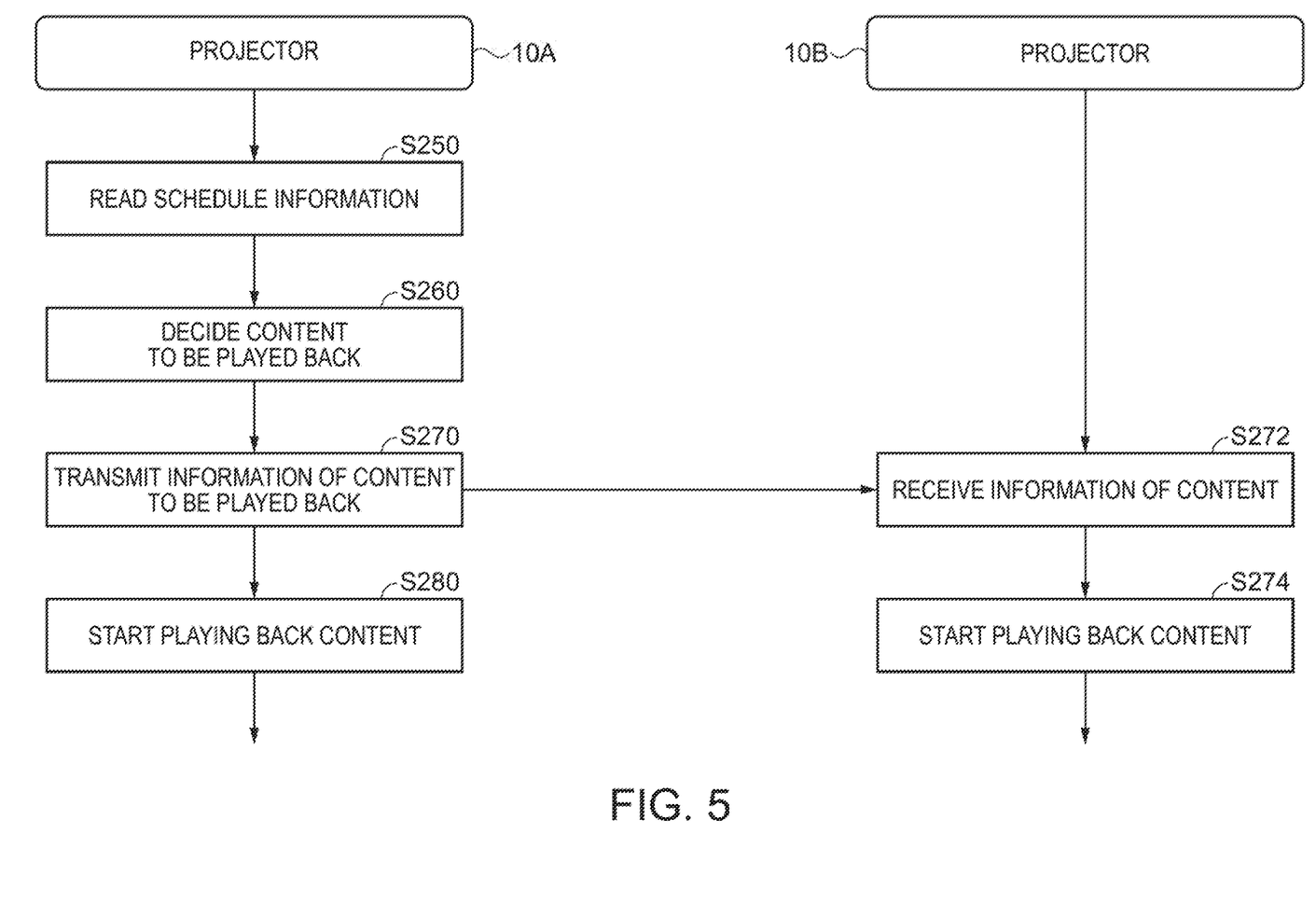
FIG. 5 is a flowchart explaining processing in which a plurality of projectors carry out simultaneous playback.

FIG. 5 is a flowchart explaining the processing in which the projector 10A and the projector 10B carry out simultaneous playback (control method).

This processing may be started based on the schedule information of the projector 10A or may be started based on an input operation by the user with the operation accepting unit 20.

As this processing is started, the control unit 60 of the projector 10A reads the schedule information (step S250).

Next, the control unit 60 of the projector 10A decides the content written in the schedule information as playback target, in order to decide content based on the schedule information (step S260).

Next, the control unit 60 of the projector 10A transmits a content ID corresponding to the playback target content to the projector 10B (step S270) and starts playing back the content corresponding to the content ID (step S280).

Meanwhile, the projector 10B receives the information of the content, transmitted from the projector 10A (step S272) and starts playing back the content corresponding to the content ID (step S274). Thus, in this embodiment, a content ID functions as a playback instruction to play back content. However, this is not limiting. For example, the projectors 10 may send to and receive from each other a command to designate simultaneous playback of content, in addition to the specification information such as content ID.

The foregoing processing enables the projector 10A and the projector 10B to share the information of the content to be played back via the content ID, and to collaboratively carry out simultaneous playback of the image and sound corresponding to the content ID.

Figure 6:
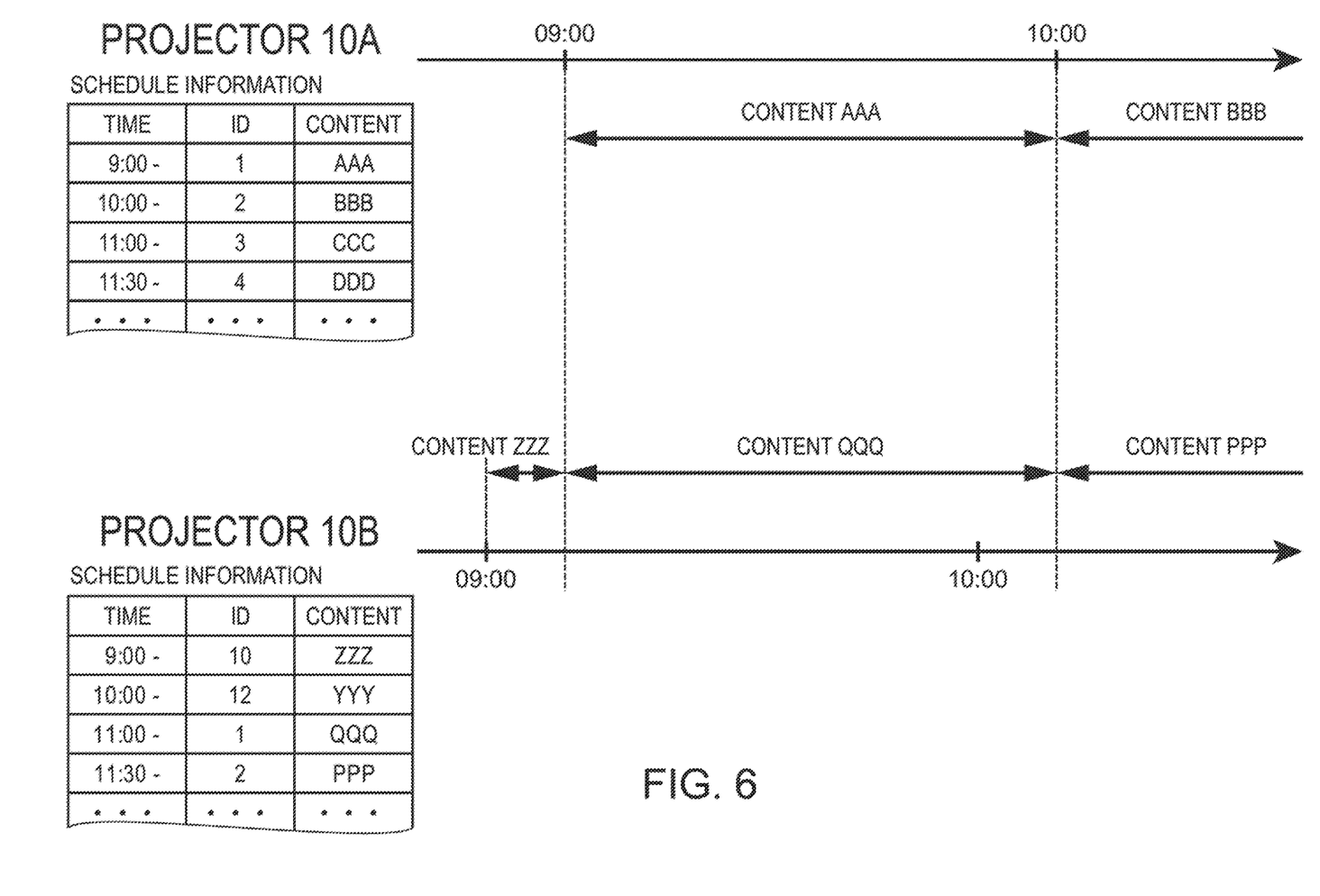
FIG. 6 shows processing in the case where a projector receives a content ID during playback of content.

Next, FIG. 6 shows the processing in the case where the projector 10A transmits information of the content ID of content to be simultaneously played back while the projector 10B is playing back content. It is assumed that the internal clock of the projector 10A and the internal clock of the projector 10B do not correspond to each other and keep different times from each other.

The projector 10B starts playing back "content ZZZ" (first content) at 9:00 shown by its own clock, based on the schedule information. The projector 10A has a response from the projector 10B that the projector 10B can carry out simultaneous playback.

The projector 10A generates a content ID (1) in order to start simultaneous playback of "content AAA" (second content) at 9:00 shown by its own clock, based on the schedule information. The projector 10A transmits the content ID (1) to the projector 10B at 9:00 and starts playing the "content AAA".

The projector 10B receives the content ID (1) from the projector 10A and reads "content QQQ" corresponding to the content ID (1) from the content information with reference to the schedule information. The projector 10B then starts playing back the "content QQQ" thus read, instead of the "content ZZZ" currently being played back. This allows the projector 10A and the projector 10B to start simultaneous playback according to the clock of the projector 10A.

Similarly, when the clock of the projector 10A shows 10:00, the projector 10A starts simultaneous playback of "content BBB" corresponding to a content ID (2) and transmits the content ID (2) to the projector 10B. The projector 10B starts simultaneous playback of "content PPP" corresponding to the content ID (2). The playback time of each piece of content is approximately a few minutes. The projector 10A and the projector 10B repeatedly play back each piece of content during one hour. Every time the projector 10A starts playing back content, the projector 10A transmits the content ID to the projector 10B.

When the projector 10A and the projector 10B synchronously carry cut simultaneous playback in this way, the internal clocks of these projectors need not correspond to each other. The projector 10B carries out simultaneous playback synchronously with the projector 10A in response to an instruction from the projector 10A.

Figure 7:
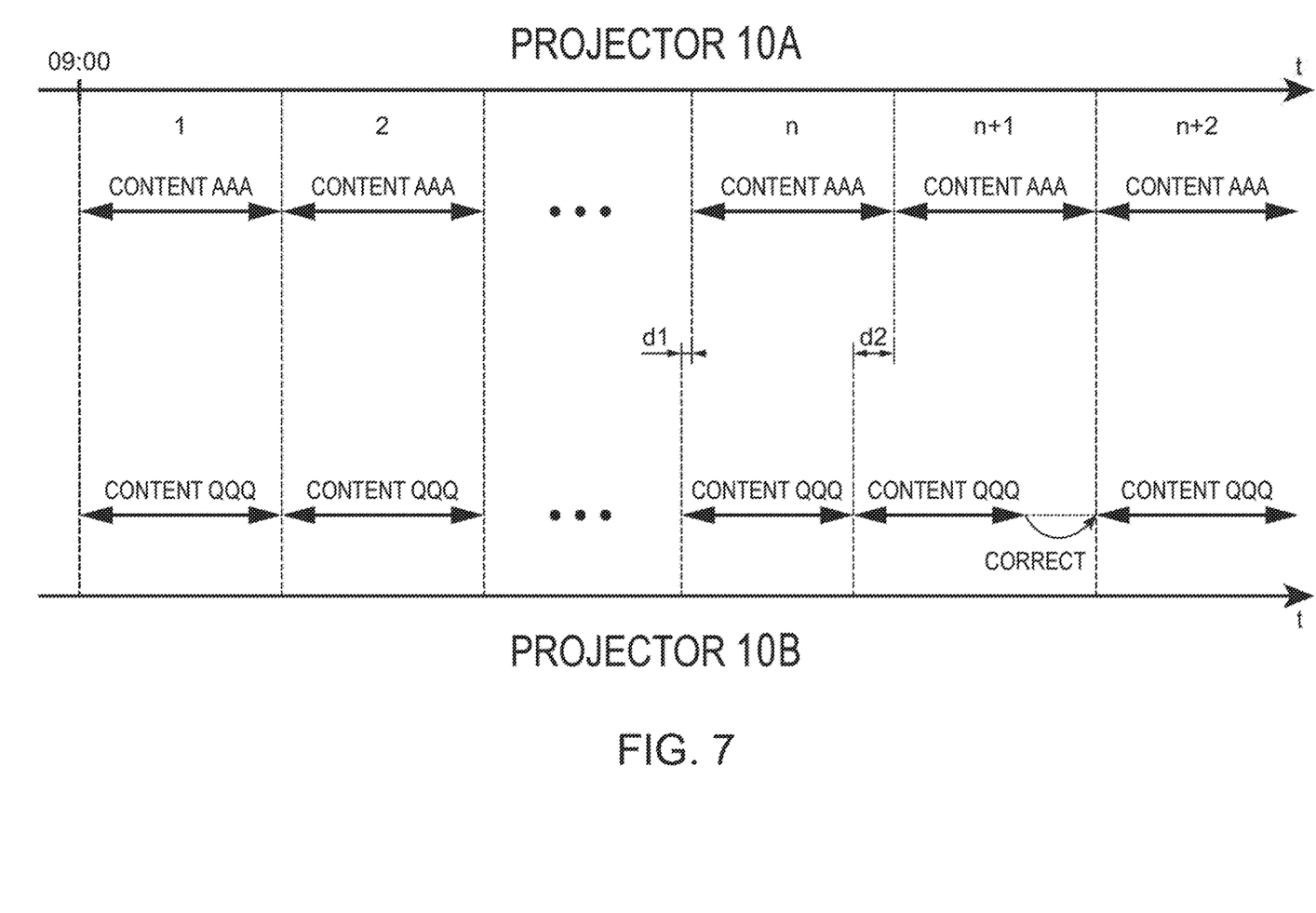
FIG. 7 shows correction of difference based on repeated playback by projectors.

Next, the processing in the case where differences in the start timing of content played back repeatedly are accumulated when the projector 10A and the projector 10B synchronously carry out simultaneous playback of the content will be described with reference to FIG. 7.

Every time the projector 10A and the projector 10B repeatedly playback content, the display system 100 measures the time difference (difference time) between the start timings of simultaneous playback, that is, between a first timing of the projector 10A and a second timing of the projector 10B. For example, it is assumed that, due to a delay or the like in the processing by the projector 10A and the projector 10B, the difference time between the start timings in the n-th round of simultaneous playback of content is d1, and that the difference time between the start timings in the (n−1)th round of simultaneous playback is d2 (where d2>d1).

The display system 100 compares the difference time with a predetermined reference time when the playback of two pieces of content is started. If the difference time d2 exceeds the predetermined reference time, the display system 100 synchronizes the projector 10A with the projector 10B again and corrects the timing of starting the playback of the next content to be played back by the projector 10B. That is, the projector 10B as the client starts playing back the "content QQQ", delaying the start timing by a predetermined time in the (n+2)th round. Thus, the timings of starting the playback of the "content AAA" and the "content QQQ" coincide with each other.

In this case, the projector 10A as the server may play back the "content AAA", advancing the start timing by a predetermined time. Also, instead of correcting the start timing, the playback speed may be changed to adjust the time taken for playback.

The foregoing embodiment has the following effects.

(1) The projector 10A projects content in response to a playback instruction including a content ID specifying the content, and also transmits the playback instruction to the projector 10B, thus enabling the projector 10B to project the content in response to the playback instruction. This enables easy execution of collaborative projection by a plurality of projectors 10.

(2) The projector 10A can execute collaborative projection with the projector 10B, based on a schedule stored in advance.

(3) The projector 10A can instruct the projector 10B based on stored group information to carry out collaborative projection.

(4) The projector 10B can receive from another projector a playback instruction including specification information that specifies content and can project the content in response to the received playback instruction. This enables easy execution of collaborative projection by the projector 10A and the projector 10B.

(5) When the projector 10B receives a playback instruction that specifies content, the projector 10B projects the content designated by the playback instruction, instead of the currently projected content. The projector 10B thus can immediately execute collaborative projection with the projector 10A.

(6) The projector 10B can properly correct a timing error generated when carrying out collaborative projection with the projector 10A, based on the difference between the timings of these projectors.

The invention has been described above, based on the illustrated embodiment. However, the invention is not limited to the embodiment and a modification like the following example is conceivable.

(7) The projector 10 is not limited to the configuration using the liquid crystal light valves 72 and may employ other configurations such as DLP (digital light processing) and LCOS (liquid crystal on screen).

What is claimed is:

1. A display system comprising a first projector and a second projector connected to each other via communication, wherein
the first projector includes:
a first projection unit which projects a first content having a content identification in response to a playback instruction for the first content; and
a transmitting unit which transmits the playback instruction to the second projector,
the second projector includes:
a receiving unit which receives the playback instruction from the first projector; and
a second projection unit which changes a projected content from a current content to a second content in response to the playback instruction, the second content having a same content identification as the first content and having a different content identification than the current content,
the playback instruction includes specification information which specifies the first content,
the display system determines a time difference between a first start timing when the first content is projected by the first projector and a second start timing when the first content is projected by the second projector and determines whether the time difference exceeds a predetermined threshold, and
when the time difference is determined to exceed the predetermined threshold, the display system corrects a second start timing of a next content to be projected by the second projector.

2. The display system according to claim 1, wherein
the first projector includes a storage unit which stores a schedule, and
the playback instruction is generated based on the schedule.

3. The display system according to claim 2, wherein
in the first projector,
the storage unit stores group information, and
the transmitting unit transmits the playback instruction to the second projector included in the group information.

4. The display system according to claim 1, wherein
the playback instruction is a combination of a command designating projection of the content and the specification information.

5. The display system according to claim 1, wherein the second projector further includes:
- a controller that determines whether the second projector is capable of performing simultaneous playback with the first projector; and
- a transmission unit that transmits an IP address of the second projector to the first projector in a case that the controller determines that the second projector is capable of performing the simultaneous playback with the first projector,
- wherein the receiving unit receives the playback instruction from the first projector after the transmission unit transmits the IP address of the second projector to the first projector.

\* \* \* \* \*